United States Patent
Spring et al.

(10) Patent No.: US 10,401,842 B2
(45) Date of Patent: Sep. 3, 2019

(54) DYNAMICALLY CONFIGURABLE PRODUCTION AND/OR DISTRIBUTION LINE CONTROL SYSTEM AND METHOD THEREFOR

(71) Applicant: SICPA HOLDING SA, Prilly (CH)

(72) Inventors: Jesper Spring, Bottens (CH); Iacopo Giangrandi, Oron-le-Chatel (CH); Francesca Acerra, Bretonnieres (CH); Philippe Leuba, L'Auberson (CH); Frederic Defever, Gland (CH)

(73) Assignee: SICPA HOLDING SA, Prilly (CH)

( * ) Notice: Subject to any disclaimer, the term of this patent is extended or adjusted under 35 U.S.C. 154(b) by 318 days.

(21) Appl. No.: 15/307,992

(22) PCT Filed: May 1, 2015

(86) PCT No.: PCT/US2015/028783
§ 371 (c)(1),
(2) Date: Oct. 31, 2016

(87) PCT Pub. No.: WO2015/168543
PCT Pub. Date: Nov. 5, 2015

(65) Prior Publication Data
US 2017/0075344 A1    Mar. 16, 2017

(30) Foreign Application Priority Data

May 1, 2014    (WO) ................ PCT/US2014/036324

(51) Int. Cl.
*G05B 19/042*    (2006.01)
*G05B 19/418*    (2006.01)

(52) U.S. Cl.
CPC ..... *G05B 19/4188* (2013.01); *G05B 19/0426* (2013.01); *G05B 2219/33125* (2013.01); *G05B 2219/34408* (2013.01); *Y02P 90/185* (2015.11)

(58) Field of Classification Search
None
See application file for complete search history.

(56) References Cited

U.S. PATENT DOCUMENTS 8,413,578 B2    4/2013    Doyle
2002/0180960 A1*  12/2002  Koren ................ G01N 21/8803
                                                356/237.2
(Continued)

FOREIGN PATENT DOCUMENTS

CN    102016931    4/2011
CN    102298372    12/2011

OTHER PUBLICATIONS

International Search Report and Written Opinion issued with respect to application No. PCT/US2015/028783.
(Continued)

*Primary Examiner* — Thomas C Lee
*Assistant Examiner* — Gary Collins
(74) *Attorney, Agent, or Firm* — Muncy, Geissler, Olds & Lowe, P.C.

(57) ABSTRACT

The present disclosure relates to control systems for controlling and dynamically configuring a production line. The production line includes one or multiple peripheral devices respectively located throughout the production line. A controller, or control unit, may, in one embodiment, extract binary instructions included in a file received from a source external to the controller, and the controller operates each of the devices on the production line based on the binary instructions embedded in the file.

20 Claims, 14 Drawing Sheets

(56) References Cited

U.S. PATENT DOCUMENTS

| | | | |
|---|---|---|---|
| 2003/0158615 A1* | 8/2003 | Weber | B65G 37/02 700/96 |
| 2006/0276921 A1* | 12/2006 | Verstraeten | G05B 19/0423 700/95 |
| 2008/0097626 A1 | 4/2008 | Reed et al. | |
| 2010/0082129 A1* | 4/2010 | McGreevy | G06Q 10/06 700/80 |
| 2010/0161121 A1 | 6/2010 | Finsterwalder | |
| 2011/0093109 A1 | 4/2011 | Scheid Budzinski et al. | |
| 2011/0231815 A1 | 9/2011 | Crippa et al. | |
| 2011/0313547 A1 | 12/2011 | Hernandez et al. | |
| 2012/0062577 A1 | 3/2012 | Nixon | |
| 2012/0226368 A1 | 9/2012 | Thomson et al. | |
| 2012/0254836 A1 | 10/2012 | Storer et al. | |

OTHER PUBLICATIONS

Chinese Office Action in counterpart Chinese Application No. 201580021677.6 dated Aug. 30, 2018 (along with English language translation).

\* cited by examiner

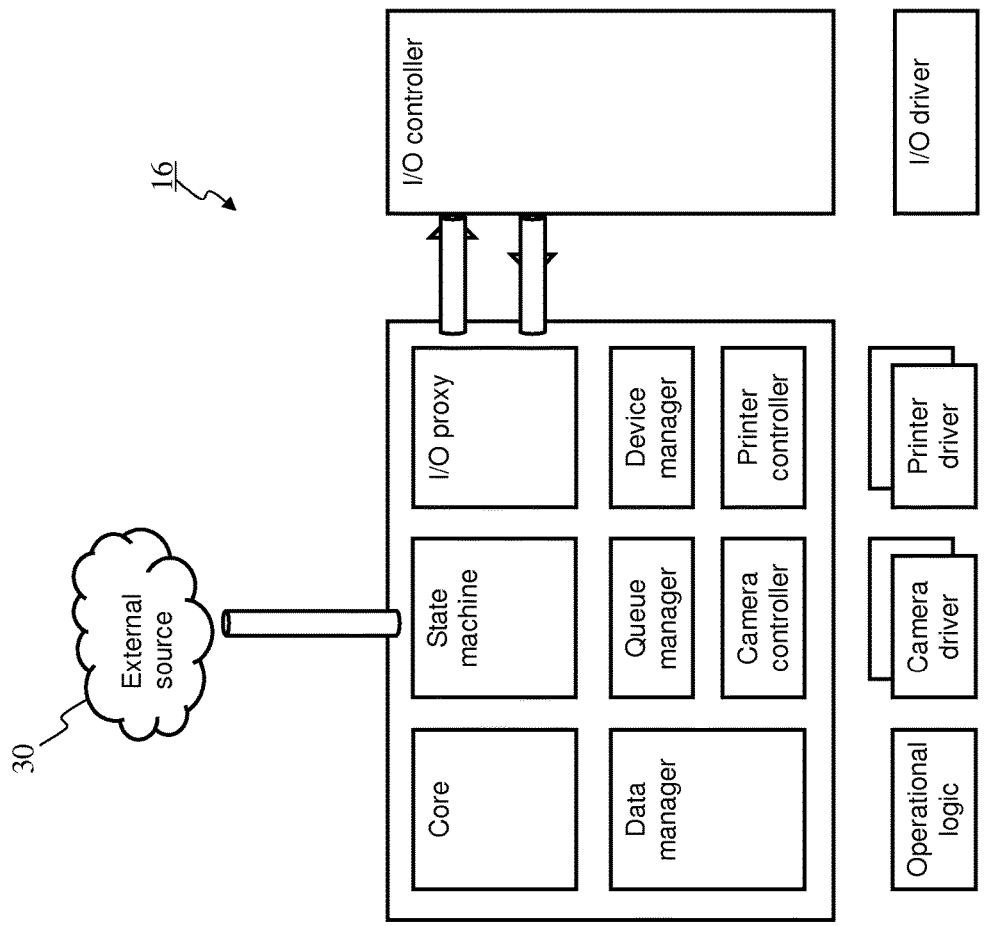
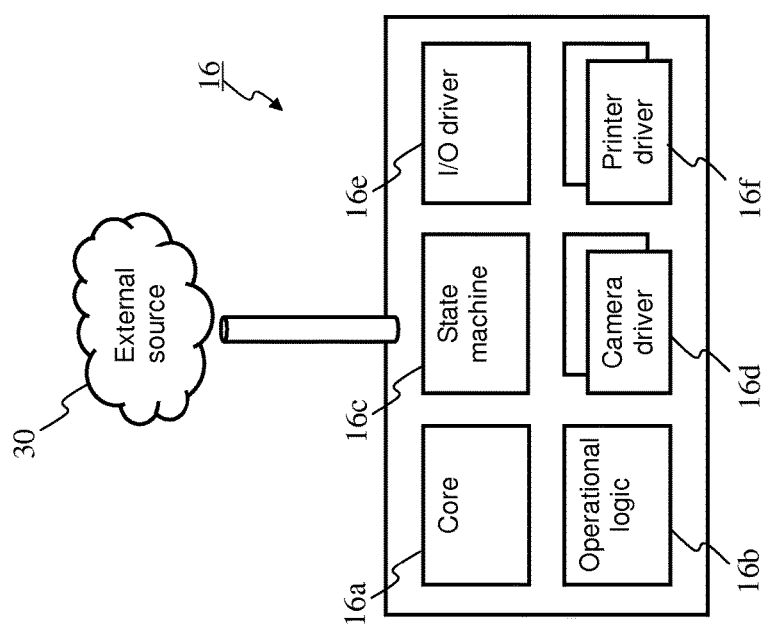

```
<StaticConfig>
    <Id>ISS-0001</Id>
    <!-- Some global parameters -->
    <Devices> <!-- Physical devices list and configurations -->
        <Device name="printer1" type="printer"
ioName="OUTPUT_PRINTER">
            <Controller>
                <Driver libName="libprinter-driver-x.so">
                    <Config> <!-- Device specific configuration, e.g.
below -->

<SerialNumber>8QV1730944IGK2K60P1</SerialNumber>
                    </Config>
                </Driver>
            </Controller>
        </Device>
        <Device name="cam1" type="camera" ioName="OUTPUT_CAMERA">
            <Controller>
                <Driver libName="libcamera-driver-x.so">
                    <Config> <!-- Device specific configuration, e.g.
below -->
                        <Address>192.168.1.30</Address>
                        <Port>1024</Port>
                    </Config>
                </Driver>
            </Controller>
        </Device>
        <Device name="ejector" type="generic" ioName="OUTPUT_EJECTOR">
<!-- Device without controller/driver -->
        </Device>
        <Device name="io" type="io">
            <!-- I/O declarations -->
        </Device>
    </Devices>
</StaticConfig>
```

Fig. 17

```
<Command type="ProductionRun">
    <Id>ISS-0001</Id>
    <MasterData>
        <Description>5 liter bottles</Description>
        <Id>abcdef</Id>
        <Fields> <!-- List of production constants -->
            <Field name="SKU">123</Field>
            <Field name="EDATE">15 02 16</Field>
        </Fields>
    </MasterData>
    <OperationalLogic libName="liboperational-logic-iss.so">
        <Config /> <!-- Optional operational logic configuration -->
    </OperationalLogic>
    <Devices>
        <Device name="cam1">
            <Config>
                <Driver>64CD6A9F</Driver> <!-- Driver specific configuration -->
            </Config>
        </Device>
        <Device name="printer1">
            <Config>
                <Driver>
                    <Layout>001A</Layout>
                </Driver>
            </Config>
        </Device>
        <Device name="ejector">
            <Config>
                <DefaultStatus>false</DefaultStatus> <!-- Tag meaning that the device is conditionally triggered -->
            </Config>
        </Device>
        ...
    </Devices>
</Command>
```

Fig. 18

```
<Command type="ProductionRun">
    <Id>ISS-0001</Id>
    <MasterData>
        ...
    </MasterData>
    <OperationalLogic libName="liboperational-logic-script.so">
        <Config>
            var _codes = Map();
            // Method called when the printer needs a code to print
            def getItemCode(noItem, code)
            {
              code = "12345";
              _codes.insert([noItem.to_string():code]);
            };
            // Method called when the camera has decoded an image
            def onItemCode(device, noItem, type, code)
            {
              if (device == "cam1") {
                var good = false;
                if (code == _codes[noItem.to_string()]) {
                  good = true;
                };
                setItemStatus("ejector", noItem, !good);
              };
            };
        </Config>
    </OperationalLogic>
    <Devices>
        ...
    </Devices>
</Command>
```

Fig. 19

DYNAMICALLY CONFIGURABLE PRODUCTION AND/OR DISTRIBUTION LINE CONTROL SYSTEM AND METHOD THEREFOR

CROSS-REFERENCE TO RELATED APPLICATIONS

The present application claims priority to International Application No. PCT/US2014/036324 filed May 1, 2014, the disclosure of which is expressly incorporated by reference herein in its entirety.

BACKGROUND

1. Field of the Disclosure

The present disclosure relates to the technical field of control systems and methods for automated production and/or distribution lines. More particularly, the disclosure relates to control systems for controlling and dynamically configuring a production and/or distribution line.

2. Background Information

In conventional control systems for automatic production volume estimation of items (bottles or cans for example) produced on a production line, the items carried along a transport path (on a conveyor, for example) are detected and counted, and encoded identification data included on each item is read out and decoded so as to identify each counted item. Sometimes, the encoded identification data is a barcode (a UPC, "Universal Product Code", for example), including data corresponding to a product type and item identification information (for example, a bottle of beer of 33 cl of a certain brand). More generally, the encoded identification data include data corresponding to product type identification information. Other examples of such product type identification data are identifiers like SKU ("Stock Keeping Unit"), EAN ("European Article Number"), GTIN ("Global Trade Item Number"), APN ("Australian Product Number") etc., which are well known to the skilled persons in the field of item identification. Based on the count value and on the read out product type and item identification information, the control system determines a production volume per product type and per item, and/or the control system associates, in a database, codes marked on items and data about said items for track and trace purposes.

In such a context (without being, however, limited to such a context), it is desirable to be able to reconfigure a production and/or distribution line, when needed.

U.S. Pat. No. 8,413,578 relates to a modular printing system for printing viscous material on electronic substrates, as well as to a control system which may communicate with printing machines and other types of equipment in a production line. The control system may dynamically inform one or more machines in the production line which operations to perform and when.

In the light of the prior art, it is further desirable to be able to efficiently, quickly and reliably reconfigure a production and/or distribution line, for example when the needs of the production and/or distribution process necessitate such a reconfiguration.

SUMMARY OF THE DISCLOSURE

To address the above-discussed problems of the prior art, a system and a method according to the invention are defined in the independent claims. Particular embodiments are defined in the dependent claims.

In one embodiment, a system is provided for controlling a production or distribution line. The system comprises at least one peripheral device operable to perform at least one peripheral device operation on the line, and a control unit comprising a processor and a memory storing a control program. The control unit is operable to control the at least one peripheral device by executing on the processor the control program to drive each of the at least one peripheral device being necessary according to a first configuration file of the control program, to carry out its respective peripheral device operation(s) according to the first configuration file, wherein the first configuration file corresponds to a first scenario of production or distribution. The system is such that said control unit is further operable (i) to stop the operations of the at least one peripheral device involved in the first scenario, to put each peripheral device in an inactive state, and then to detect that each peripheral device is in an inactive state; (ii) to receive a reconfiguration instruction from an external source; (iii) upon detecting that each peripheral device is in an inactive state and receiving the reconfiguration instruction, to configure each of the at least one peripheral device being necessary according to a second configuration file of said control program, wherein the second configuration file corresponds to a second scenario of production or distribution, and the second scenario differs from the first scenario; (iv) to detect a state, hereinafter referred to as "ready state", according to which each of the at least one peripheral device being necessary for the second scenario is ready to carry out its respective peripheral device operation(s) according to the second configuration file; and, (v) upon detecting said ready state, to control the at least one peripheral device by executing on the processor the control program to drive each of the at least one peripheral device being necessary for the second scenario, to carry out its respective peripheral device operation(s) according to the second configuration file, thereby causing a reconfiguration of the line without restarting said control program.

In one aspect, said second configuration file is stored in the memory (of the control unit) and said reconfiguration instruction comprises a name or an identifier of said second configuration file to be executed by the processor of the control unit (to make the peripheral device(s) involved in the second scenario operating according to said second scenario).

In another aspect, said reconfiguration instruction comprises a compiled binary file corresponding to said second configuration file to be executed by the processor of the control unit (to make the peripheral device(s) involved in the second scenario operating according to said second scenario).

In still another aspect, said control unit further includes a compiler and said reconfiguration instruction comprises a non-binary file corresponding to said second configuration file, the control unit being operable to compile the non-binary file with the compiler and to execute the compiled non-binary file on the processor of the control unit (to make the peripheral device(s) involved in the second scenario operating according to said second scenario).

In yet another aspect, said control unit further includes an interpreter and said reconfiguration instruction comprises a non-binary file corresponding to said second configuration file, the control unit being operable to interpret the non-binary file with the interpreter and to execute the interpreted non-binary file on the processor of the control unit (to make the peripheral device(s) involved in the second scenario operating according to said second scenario).

In another aspect, said external source operable to send a reconfiguration instruction to the control unit comprises at least one of: a user terminal operable by a user to input said reconfiguration instruction and to send it to the control unit via a communication link; and a remote server operable to send said reconfiguration instruction to the control unit via a communication link.

In still another aspect, the at least one peripheral device comprises at least one of: a peripheral device operable to perform a peripheral device operation consisting in marking an item transported on a conveyor; and a peripheral device operable to perform a peripheral device operation consisting in imaging or reading a marking on an item transported on the conveyor.

In yet another aspect, the at least one peripheral device comprises a plurality of peripheral devices being all involved in both the first scenario and the second scenario; and the second scenario differs from the first scenario in that at least one of said plurality of peripheral devices is driven to perform at least one peripheral device operation according to the second scenario differently than when driven according to the first scenario.

In another aspect, the at least one peripheral device comprises a plurality of peripheral devices; and the second scenario differs from the first scenario at least in that: the plurality of peripheral devices comprises a first subset of at least one peripheral device involved in the first scenario and a second subset of at least one peripheral device involved in the second scenario, and the first subset at least partially differs from the second subset.

In still another aspect, said plurality of peripheral devices comprises: a printer operable to perform a peripheral device operation consisting in printing a marking on an item on the conveyor; a camera operable to perform a peripheral device operation consisting in capturing a digital image of a marking on an item on the conveyor; and an ejector operable to perform a peripheral device operation consisting in ejecting an item from the conveyor.

In yet another aspect, the processor is further operable to perform image processing operations on a digital image of a marking on an item received from the camera, associate data resulting from said image processing operations with stored item data, and store the associated data in the memory.

In another aspect, the processor is further operable to perform image processing operations on a digital image of a marking on an item received from the camera, compare data resulting from said image processing operations with stored reference item data, and store a result of said comparison in the memory.

In another embodiment, a method is provided for controlling a production or distribution line. The method involves at least one peripheral device operable to perform at least one peripheral device operation on the line, and a control unit comprising a processor and a memory storing a control program. The method comprises: the control unit controlling the at least one peripheral device by executing on the processor the control program to drive each of the at least one peripheral device being necessary according to a first configuration file of the control program, to carry out its respective peripheral device operation(s) according to the first configuration file, wherein the first configuration file corresponds to a first scenario of production or distribution. The method further comprises: the control unit (i) stopping the operations of the at least one peripheral device involved in the first scenario, putting each peripheral device in an inactive state, and then detecting that each peripheral device is in an inactive state; (ii) receiving a reconfiguration instruction from an external source; (iii) upon detecting that each peripheral device is in an inactive state and receiving the reconfiguration instruction, configuring each of the at least one peripheral device being necessary according to a second configuration file of said control program, wherein the second configuration file corresponds to a second scenario of production or distribution, and the second scenario differs from the first scenario; (iv) detecting a state, hereinafter referred to as "ready state", according to which each of the at least one peripheral device being necessary for the second scenario is ready to carry out its respective peripheral device operation(s) according to the second configuration file; and, (v) upon detecting said ready state, controlling the at least one peripheral device by executing on the processor the control program to drive each of the at least one peripheral device being necessary for the second scenario, to carry out its respective peripheral device operation(s) according to the second configuration file, thereby causing a reconfiguration of the line without restarting said control program.

In one aspect, the first and second scenarios of production or distribution each correspond to a production or distribution run order.

In another aspect, a configuration file is an extensible markup language (XML) file.

BRIEF DESCRIPTION OF THE DRAWINGS

FIGS. 5 and 6 schematically illustrate some functional components of a control program of two control units 16 according to two embodiments of the invention, respectively.

FIGS. 17 to 19 show some examples of segments of configuration files, which may be used in some embodiments of the invention.

DETAILED DESCRIPTION

In view of the foregoing, the present disclosure, through one or more of its various aspects, embodiments and/or specific features or sub-components, is thus intended to bring out one or more of the advantages as specifically noted below.

Figure 1:
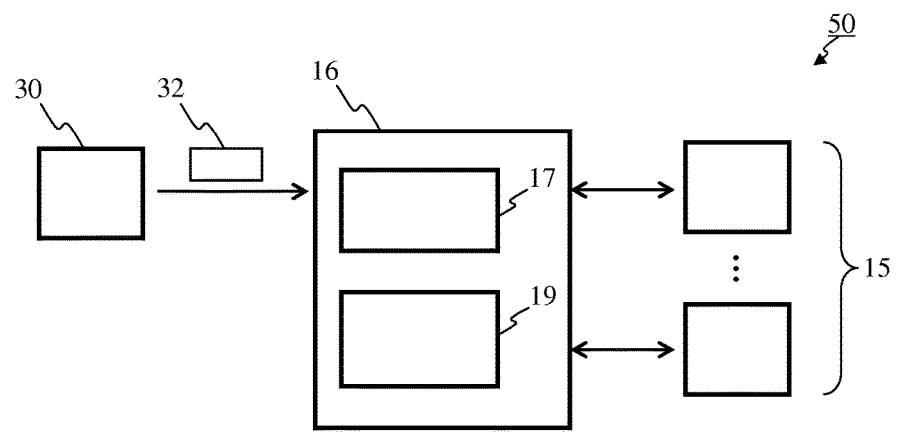
FIG. 1 schematically illustrates a system according to one embodiment of the invention.

FIG. 1 schematically illustrates a system 50 according to one embodiment of the invention, the system 50 being provided for controlling a production or distribution line.

System 50 comprises at least one peripheral device 15, such as for example one peripheral device 15 (not illustrated on FIG. 1), two peripheral devices 15, or any other number of peripheral devices 15. The peripheral device(s) 15 are operable to perform at least one peripheral device operation on the line. This means that, if, for example, there are M peripheral devices 15 (M being an integer such that M>0), the first peripheral device $15_1$ may be operable to perform a number N1 of distinct peripheral device operations (with N1 being an integer such that N1>0), the second peripheral device $15_2$ may be operable to perform a number N2 of distinct peripheral device operations (with N2 being an integer such that N2>0), etc. In one embodiment, each peripheral device 15 is operable to perform one peripheral device operation on the line (or one type of peripheral device operation), wherein this peripheral device operation may be repeatable, for example per item or group of items.

A peripheral device operation may for example consist in marking an item transported on a conveyor of the line, imaging or reading a marking on an item transported on the conveyor, or ejecting an item from the conveyor.

System 50 further comprises a control unit 16 comprising a processor 17 and a memory 19 storing a control program. Control unit 16 is typically capable of communicating with each of the peripheral device(s) 15 of the system 50, i.e. for sending commands to each or all of the peripheral device(s) 15, and for receiving information from the peripheral device(s) 15. How the communication may for example be implemented between control unit 16 and peripheral device(s) 15 will be explained below with reference to FIG. 4. In particular, an exemplary I/O card may be provided between control unit 16 and the peripheral device(s) 15 for supporting real-time communication for time-critical applications.

Control unit 16 is operable to control peripheral device(s) 15 according to distinct configuration files of the control program, such as for example a first configuration file and a second configuration file, or any number of distinct configuration files, each corresponding to a distinct scenario of production or distribution of the line. In particular, the line may first be configured to operate according to a first scenario (e.g. to handle, on the line, a first type of products/items or a first batch of products/items intended for a first country, client or market), then there may be a reconfiguration of the line, and, after a successful reconfiguration, the line may operate according to a second scenario (e.g. to handle, on the line, a second type of products/items or a second batch of products/items intended for a second country, client or market). Each configuration file may, in one embodiment, specify, explicitly or implicitly, which peripheral device(s) 15 are involved in the corresponding scenario, and how the peripheral device(s) 15 are instructed to operate in said corresponding scenario (e.g., which operations are to be carried out, how, or based on which parameters and/or according to which timing).

In particular, control unit 16 is operable to control peripheral device(s) 15 by executing on the processor 17 the control program to thereby drive each of the peripheral device(s) 15 being necessary in accordance with a first configuration file of the control program (i.e. being necessary in the first scenario), in the sense that each peripheral device 15 involved in the first scenario is driven to carry out its respective peripheral device operation(s) according to the first configuration file.

Figure 2:
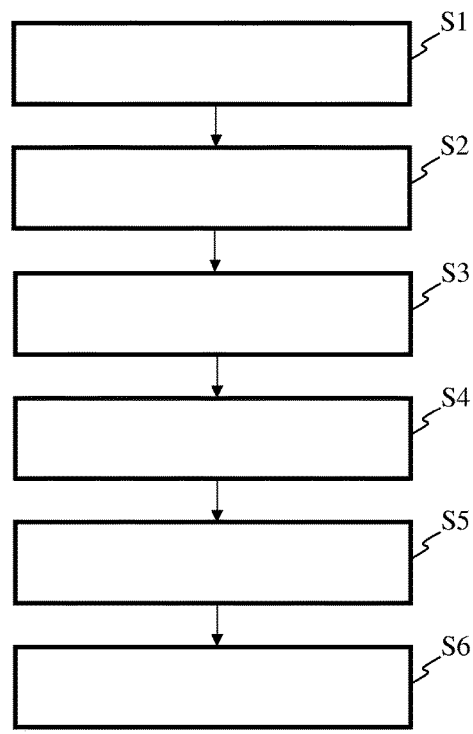
FIG. 2 is a flowchart of a method according to one embodiment of the invention.

Then, for example when the first scenario is completed (e.g., because the corresponding production run is completed, all items having been handled) or when an operator decides to put an end to the first scenario, the control unit 16 operates to carry out a number of operations which may lead to a successful reconfiguration of the line, without the need for restarting the control program. These operations will now be described with reference to FIG. 2, which is a flowchart of a method according to one embodiment of the invention.

In step S1 ("Operation according to first scenario"), the peripheral device(s) 15 involved in the first scenario, i.e. those necessary according to, i.e. as indicated by, the first configuration file, are driven, by control unit 16, to carry out their respective peripheral device operation(s) in accordance with the first configuration file.

Then, in step S2 ("Stopping the peripheral device(s) involved in the first scenario"), control unit 16 causes the operations of the peripheral device(s) 15 involved in the first scenario to stop.

Still in step S2, each peripheral device 15 is put in an inactive state, no matter whether the peripheral device 15 has been involved in the first scenario. In other words, if there is a plurality of peripheral device(s) 15 among which a subset has been involved in the first scenario and another subset has not been involved in the first scenario, they are nevertheless all put in an inactive state. Putting a peripheral device 15 in an inactive state may, in one embodiment, involve some interactions between control unit 16 and said peripheral device 15 to instruct said peripheral device 15 to enter such a state. In one embodiment, in the inactive state, a peripheral device 15 is set 'off-line'. How this may be done is device-specific. In particular, if a peripheral device 15 supports an 'off-line' mode, it will be set to that mode, and, in parallel to this, the control program will maintain the device state, here set to inactive.

Yet further, still in step S2, control unit 16 detects that each peripheral device 15 is in an inactive state. In other words, if there is a plurality of peripheral device(s) 15 among which a subset has been involved in the first scenario and another subset has not been involved in the first scenario, control unit 16 detects that they are all in an inactive state. The state of each of the peripheral device(s) 15 is maintained in or by the control program, for example via a state machine maintained for example per peripheral device 15.

In step S3 ("Receiving a reconfiguration instruction"), control unit 16 receives a reconfiguration instruction 32 from an external source 30 for configuring the line according to a second scenario. In one embodiment, the external source 30 comprises at least one of: a user terminal operable by a user to input said reconfiguration instruction and to send it to the control unit via a communication link; and a remote server operable to send said reconfiguration instruction to the control unit via a communication link. The user terminal may be any type of user terminal such as for example a desktop computer, a laptop, a tablet, a netbook, a mobile phone, or a smartphone.

In step S4 ("Configuring the peripheral device(s) involved in the second scenario"), control unit 16 configures the peripheral device(s) 15 that are necessary according to a second configuration file of said control program, i.e. those peripheral device(s) 15 that are involved in the second scenario. Step S4 is, however, only undertaken when control unit 16 has detected that each peripheral device 15 is in an inactive state (according to step S2) and control unit 16 has received the reconfiguration instruction (according to step S3). The configuration of the peripheral device(s) 15 that are necessary according to a second configuration file may for example involve, but is not limited to, the selection of a particular type of marking to print using a printer, the rules governing when to operate a camera, or the rules governing when to eject a product item from the carrier (conveyor) using an ejector.

In step S5 ("Detecting ready state for peripheral device(s) of second scenario"), control unit 16 detects that the peripheral device(s) 15 being necessary for the second scenario, i.e. those peripheral device(s) 15 that are involved in the second scenario, have been successfully configured and are ready for carrying their respective operation according to the second configuration file.

Then, in step S6 ("Operation according to second scenario"), the peripheral device(s) 15 involved in the second scenario, i.e. those necessary according to the second configuration file, are driven, by control unit 16, to carry out their respective peripheral device operation(s) in accordance with the second configuration file. Step S6 is, however, only undertaken when control unit 16 has detected that each peripheral device 15 involved in the second scenario is in a ready state (according to step S5). In other words, the control program executed on processor 17 then drives each of the peripheral device(s) 15 being necessary for the second scenario, to carry out its respective peripheral device operation(s) according to the second configuration file. The control program therefore causes the control unit 16 and the peripheral device(s) 15 to dynamically alter operation of the production line for a particular production run corresponding to the second configuration file.

This enables and thereby causes a reconfiguration of the line without restarting said control program, thus providing an efficient, quick, flexible and reliable reconfiguration of the line.

This is particularly advantageous in case of small batches of products or items to be marked for identification and/or authentication according to different rules (depending on the product type, country of destination, etc.) on a same production line. This is typically, but not only, the case in the pharmaceutical industry: the marking must often obey strict rules for security or legal compliance while allowing reliable tracking and tracing. For example, some packaging are to be marked on side and top regarding certain data and then on another part for track and trace purpose (via association of read data, possibly from several readers). Moreover, it may be important for security or legal reasons that a damaged or incorrectly marked packaging be ejected from the production line and even that the ejection result itself be controlled via a sensor. In these applications, a flexible, quick and dynamic reconfiguration of the various peripheral devices 15 (e.g., marking, reading, or handling devices) operating on the production line is particularly advantageous.

After a reconfiguration of the line from a first scenario (according to a first reconfiguration file) to a second scenario (according to a second reconfiguration file), the line may be further reconfigured to allow a third scenario to be carried out (according to a third reconfiguration file), and so on. It should in any event be understood that a first scenario need not be the very first scenario the line has ever had to deal with, but the first scenario may have been preceded by other scenarios, such as for example other production or distribution runs. In other words, in the transition between an $i^{th}$ scenario to an $(i+1)^{th}$ scenario, the $i^{th}$ scenario is a first scenario and the $(i+1)^{th}$ scenario is a second scenario; in the transition between an $(i+1)^{th}$ scenario to an $(i+2)^{th}$ scenario, the $(i+1)^{th}$ scenario is a first scenario and the $(i+2)^{th}$ scenario is a second scenario; etc.

FIGS. 3(a) to (d) schematically illustrate four different types of reconfiguration of the line, for an exemplary number of three peripheral devices 15, according to four embodiments of the invention respectively. In each of FIGS. 3(a) to (d), the left-hand side system 50 is the configuration before the reconfiguration of the line (i.e., according to a first reconfiguration file) and the right-hand side system 50 is the configuration after the reconfiguration of the line (i.e., according to a second reconfiguration file). The peripheral devices 15 marked with "Y" are involved in the illustrated configuration, and those marked with "N" are not involved in the illustrated configuration.

Figure 3:
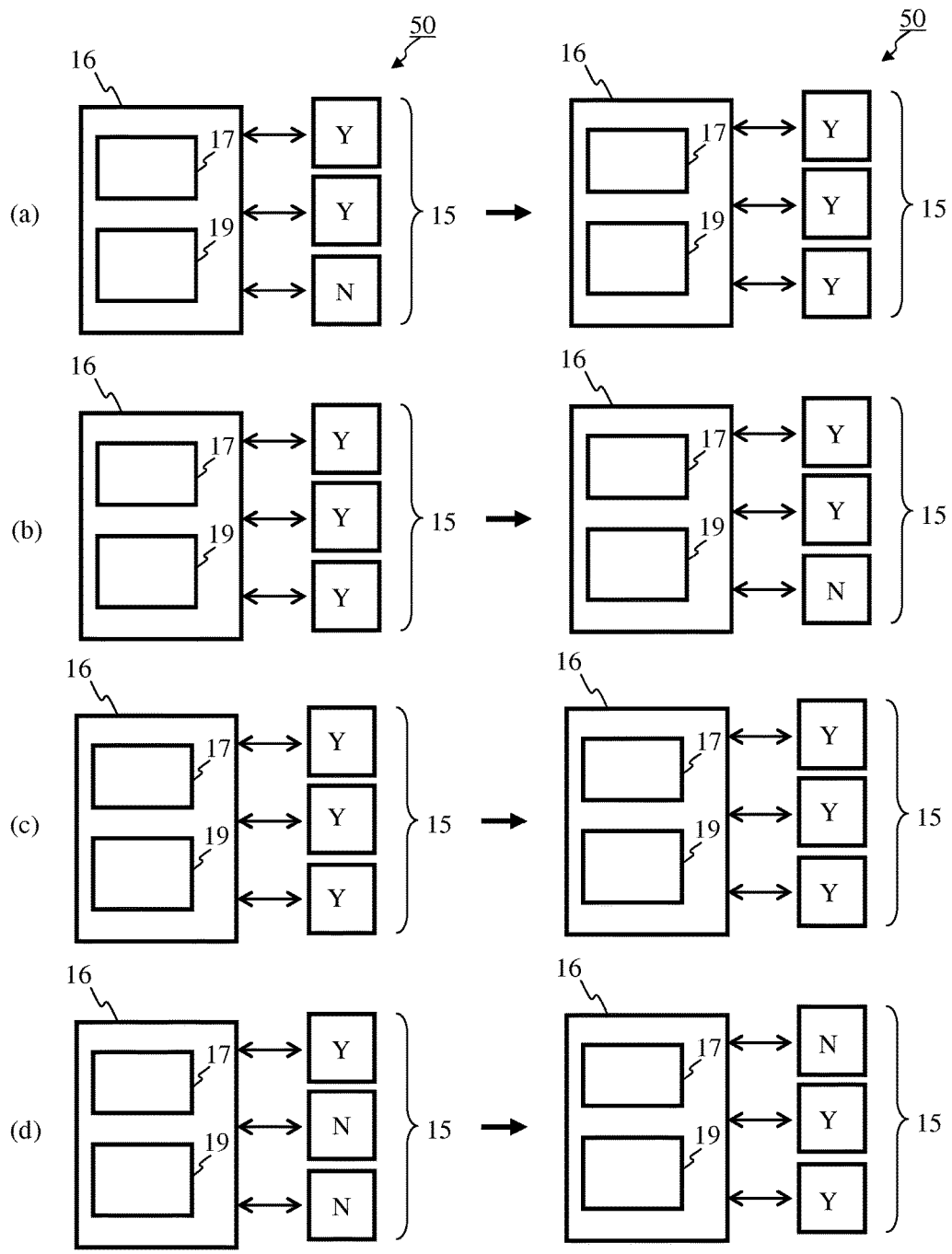
FIGS. 3(a) to (d) schematically illustrate four different types of reconfiguration of a production or distribution line according to four embodiments of the invention, respectively.

In FIG. 3(a), two peripheral devices 15 are involved in the first scenario, and three peripheral devices 15 are involved in the second scenario, among which the two that were involved in the first scenario. In this embodiment, in the second scenario, the two peripheral devices 15 which were involved in the first scenario may or may not be driven to perform their respective peripheral device operation(s) according to the second scenario differently than when driven according to the first scenario.

In FIG. 3(b), three peripheral devices 15 are involved in the first scenario, and two of them are involved in the second scenario. In this embodiment, the two peripheral devices 15 involved in the second scenario may or may not be driven to perform their respective peripheral device operation(s) according to the second scenario differently than when driven according to the first scenario.

In FIG. 3(c), three peripheral devices 15 are involved in the first scenario, and the same three peripheral devices 15 are also involved in the second scenario. In this embodiment, at least one of the peripheral devices 15 is driven to perform its peripheral device operation(s) according to the second scenario differently than when driven according to the first scenario. Otherwise, the first and second scenarios would not differ.

In FIG. 3(d), one peripheral device 15 is involved in the first scenario, and two other peripheral devices 15 are involved in the second scenario.

Figure 4:
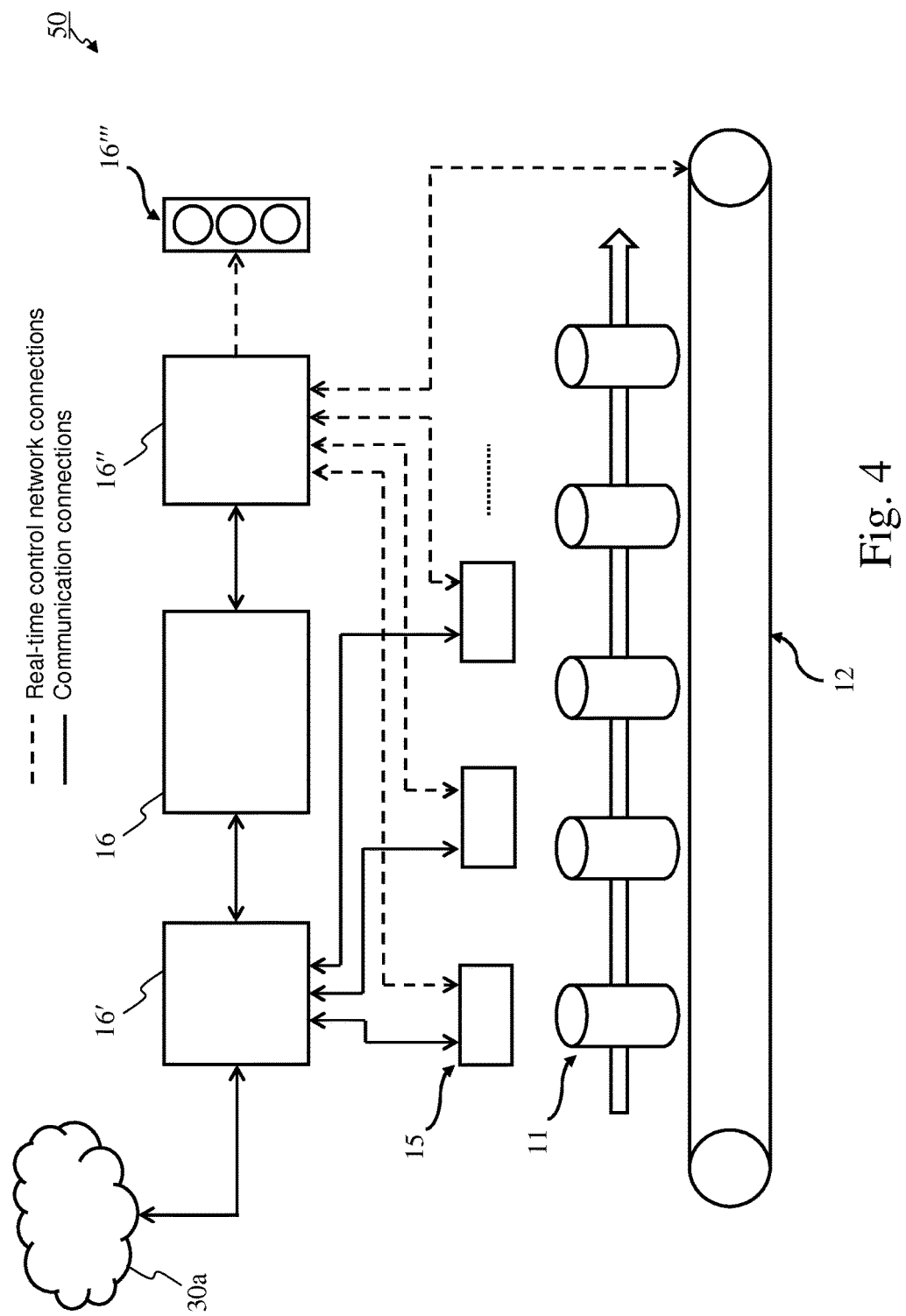
FIG. 4 schematically illustrates a system according to another embodiment of the invention.

FIG. 4 schematically illustrates a system 50 according to one embodiment of the invention. System 50 involves, in this embodiment, the following components:
- a transport system 12, such as for example a conveyor 12 or any other type of carriers to move a product item on the production line,
- items 11 transported on the conveyor 12, such as for example manufactured products, bottles, cans, cigarette packs, medicine packs, cartons, or boxes,
- peripheral devices 15, such as for example triggers, cameras, printers, or ejectors,
- a control unit 16, such as for example a computer running any operating system,
- an input/output (I/O) card 16" allowing real-time communication between control unit 16 and peripheral devices 15, such as for transmitting real-time instructions from control unit 16 to peripheral devices 15, or time-critical events from peripheral devices 15 to control unit 16, the communication protocol used being for example EtherCAT, an Internet Protocol (IP) switch 16' allowing communication between control unit 16 and peripheral devices 15, such as for example for transmitting digital images captured by a camera, a signaling light 16''' for signaling the status of the line to an operator, and a backend network 30a allowing a reconfiguration instruction to be transmitted from an external source 30 (not illustrated in FIG. 4), for example in a message carried by one or more IP packets, messages, datagrams, or the like.

In one embodiment, the system 50 is such that it does not use any programmable logic controller (PLC). In other words, in this embodiment, none of the peripheral device(s) 15 is a PLC. The presence of I/O cards 16" enables to operate without any PLCs, which are typically expensive. This is therefore particularly advantageous.

FIGS. 5 and 6 schematically illustrate two sets of functional components or modules which may be involved in the constitution of the control unit 16, in two embodiments of the invention respectively.

In particular, FIG. 5 shows the logical structure (or architecture) of the control program running on the control unit 16, in one embodiment of the invention. The core 16a is responsible for scheduling internal communication between all elements of the control program. The operational logic module 16b is responsible for data processing in/out of peripheral devices 15 and/or for implementing rules governing the operation of the line as a result, for example, of events associated with operations occurring on the line (e.g. final quality control for determining whether a product is to be kept or rejected). The state machine 16c is responsible for managing the internal state of the control program. Each camera driver 16d is responsible for the communication protocol with a dedicated camera device. I/O driver 16e is responsible for the real-time communication protocol with the input/output cards and, beyond, the peripheral devices 15. Each printer driver 16f is responsible for the communication protocol with a dedicated printer device.

FIG. 6 shows another logical structure (or architecture) of the control program running on the control unit 16, in one embodiment of the invention, which will not be described here in detail, but the skilled person will readily understand the depicted functions, which should be self-explanatory.

Figure 7:
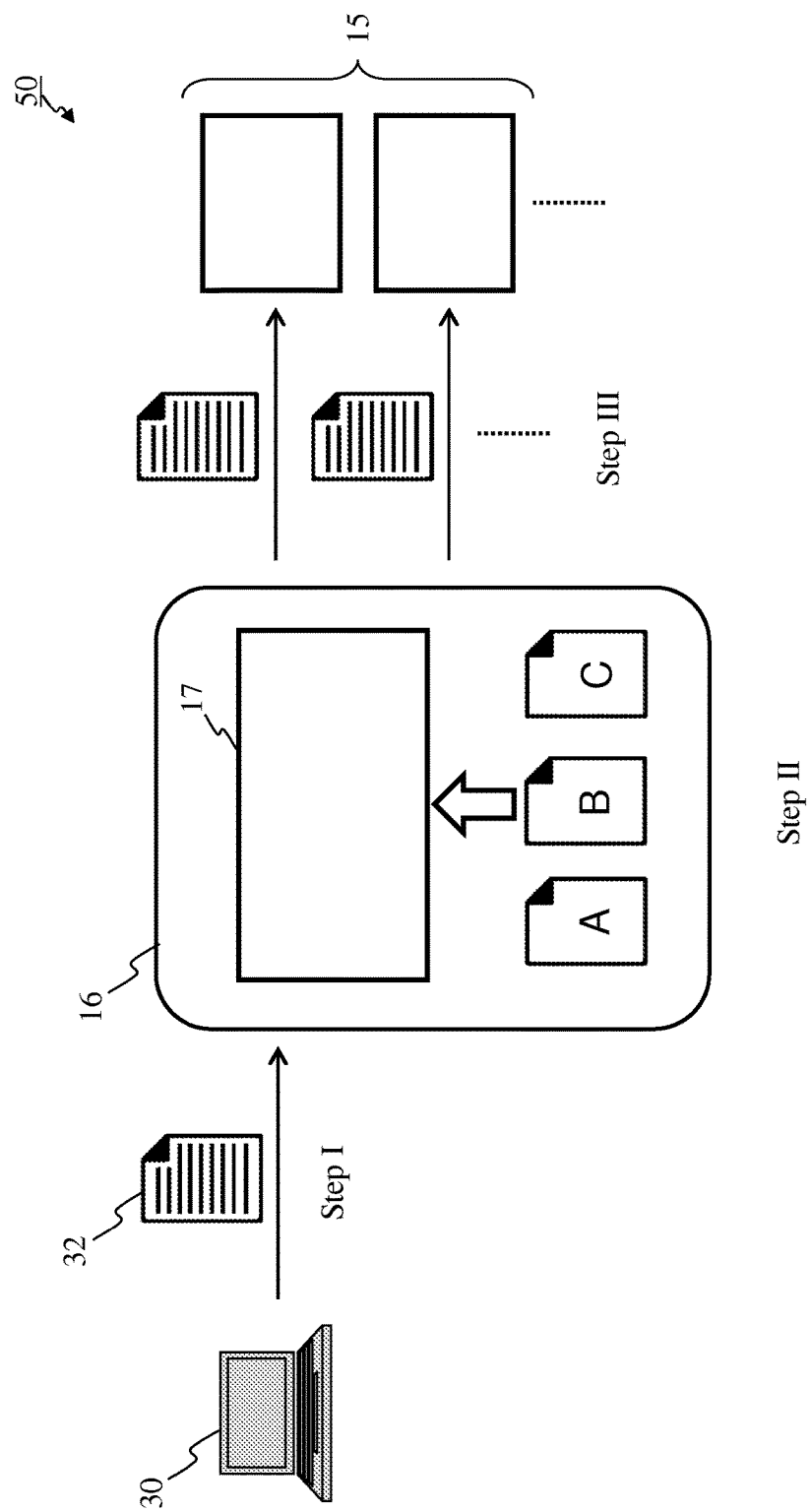
FIGS. 7 to 10 schematically illustrate systems and methods according to four embodiments of the invention.

FIG. 7 schematically illustrates a system and method according to one embodiment of the invention, wherein the second configuration file, such as for example configuration file called "B", is stored in the memory of the control unit 16, and said reconfiguration instruction 32 comprises a name or an identifier of said second configuration file to be executed by processor 17 of control unit 16. In other words, the second configuration file and the logic underlying the second scenario are dynamically loaded by control unit 16 ("Step II"), after control unit 16 received a name or an identifier of the second configuration file from an external source 30 ("Step I"). In other words, the logic indicated in step I is loaded in step II. Then, in step III, peripheral devices 15 are configured according to the second configuration file (see FIG. 2, step S4).

Figure 8:
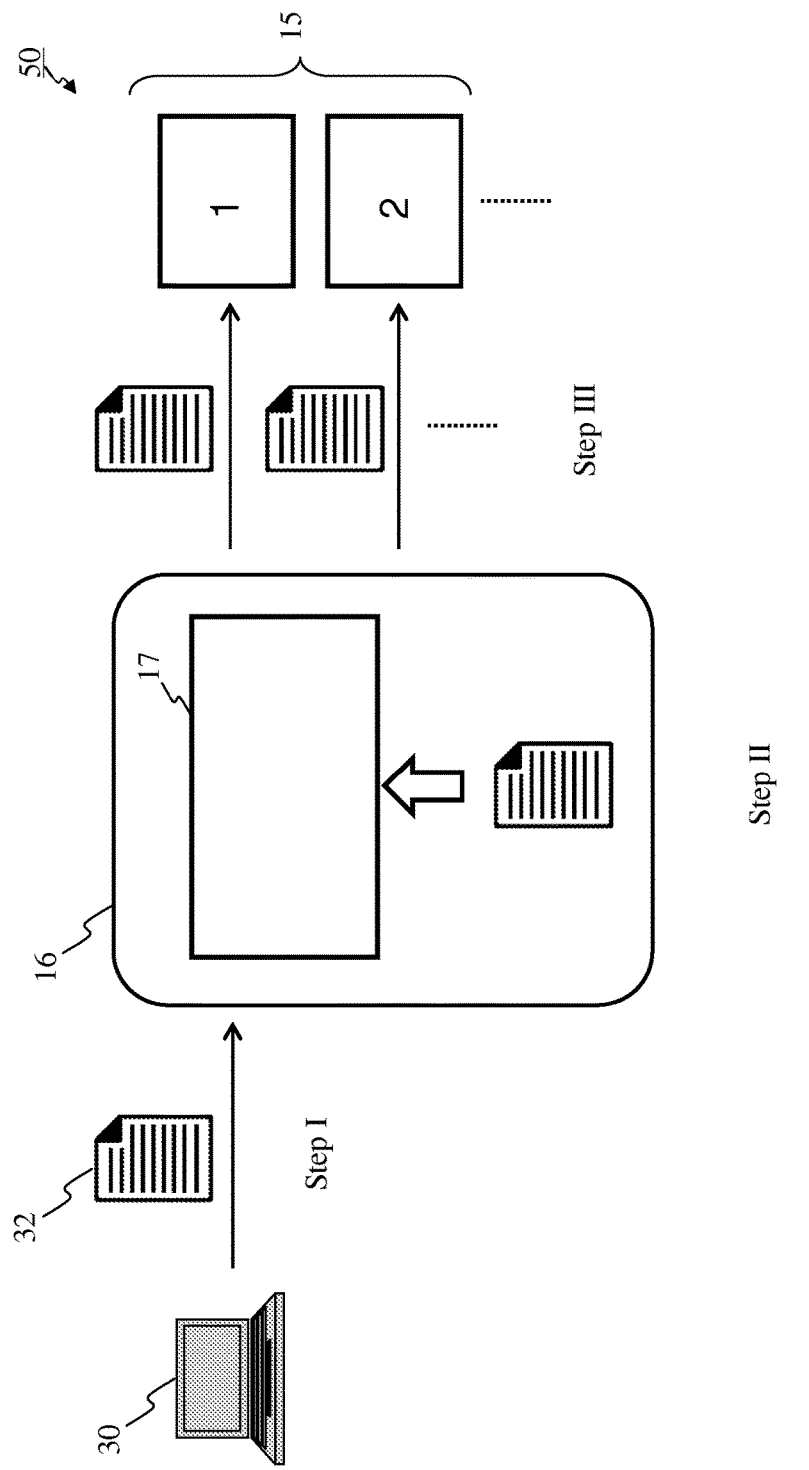

FIG. 8 schematically illustrates a system and method according to one embodiment of the invention, wherein the reconfiguration instruction 32 comprises a compiled binary file corresponding to said second configuration file to be executed by the processor 17 of the control unit 16. In other words, a compiled binary file corresponding to said second configuration file is provided to control unit 16 as part of the reconfiguration instruction 32 ("Step I") so as to be able to dynamically load the second configuration file and the logic underlying the second scenario on control unit 16 ("Step II"). Then, in step III, peripheral devices 15 are configured according to the second configuration file (see FIG. 2, step S4). The compiled binary file may for example be, for implementing the logic on the control unit 16, a precompiled C or C++ file, and for the device configuration, the compiled binary file may be for example device-specific, e.g. in proprietary format.

The reconfiguration instruction 32 may, in one embodiment, comprise more than one compiled binary file, for performing distinct operations associated with the second scenario and/or for execution on the control unit 16 or on a peripheral device 15. For example, one compiled binary file may be dedicated to an image processing task based on the input from a camera (being a peripheral device), to be executed on a peripheral device 15, and another compiled binary file may be dedicated to an error processing task based on the input from the same or another peripheral device, to be executed on control unit 16.

Figure 9:
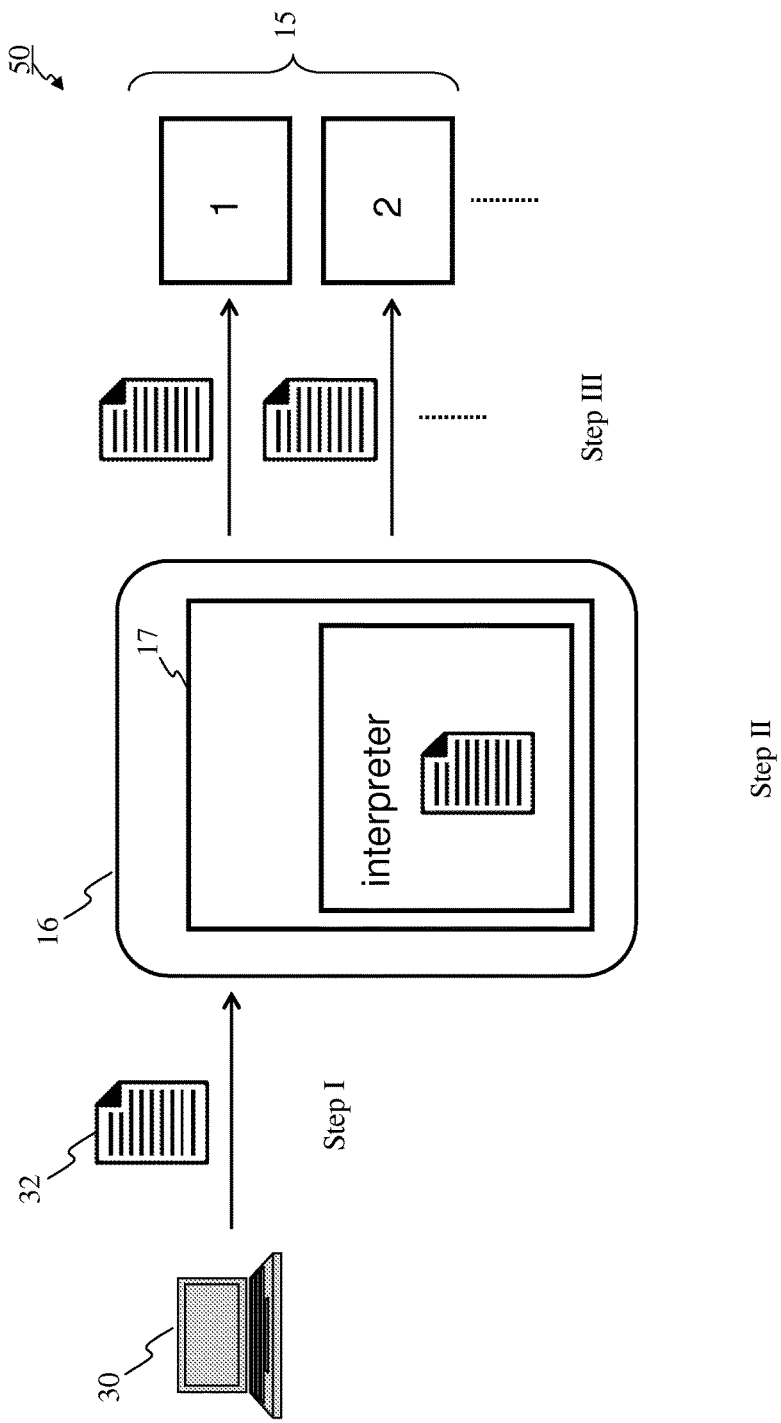

FIG. 9 schematically illustrates a system and method according to one embodiment of the invention, wherein said control unit 16 further includes an interpreter and said reconfiguration instruction 32 comprises a non-binary file corresponding to said second configuration file ("Step I"), the control unit 16 being operable to interpret the non-binary file with the interpreter ("Step II") and to execute the interpreted non-binary file on processor 17 of control unit 16, so as to configure peripheral device(s) 15 for the second scenario ("Step III"). The reconfiguration instruction 32 may, in one embodiment, comprise more than one non-binary file, for performing distinct operations associated with the second scenario and/or for execution on the control unit 16 or on a peripheral device 15.

Figure 10:
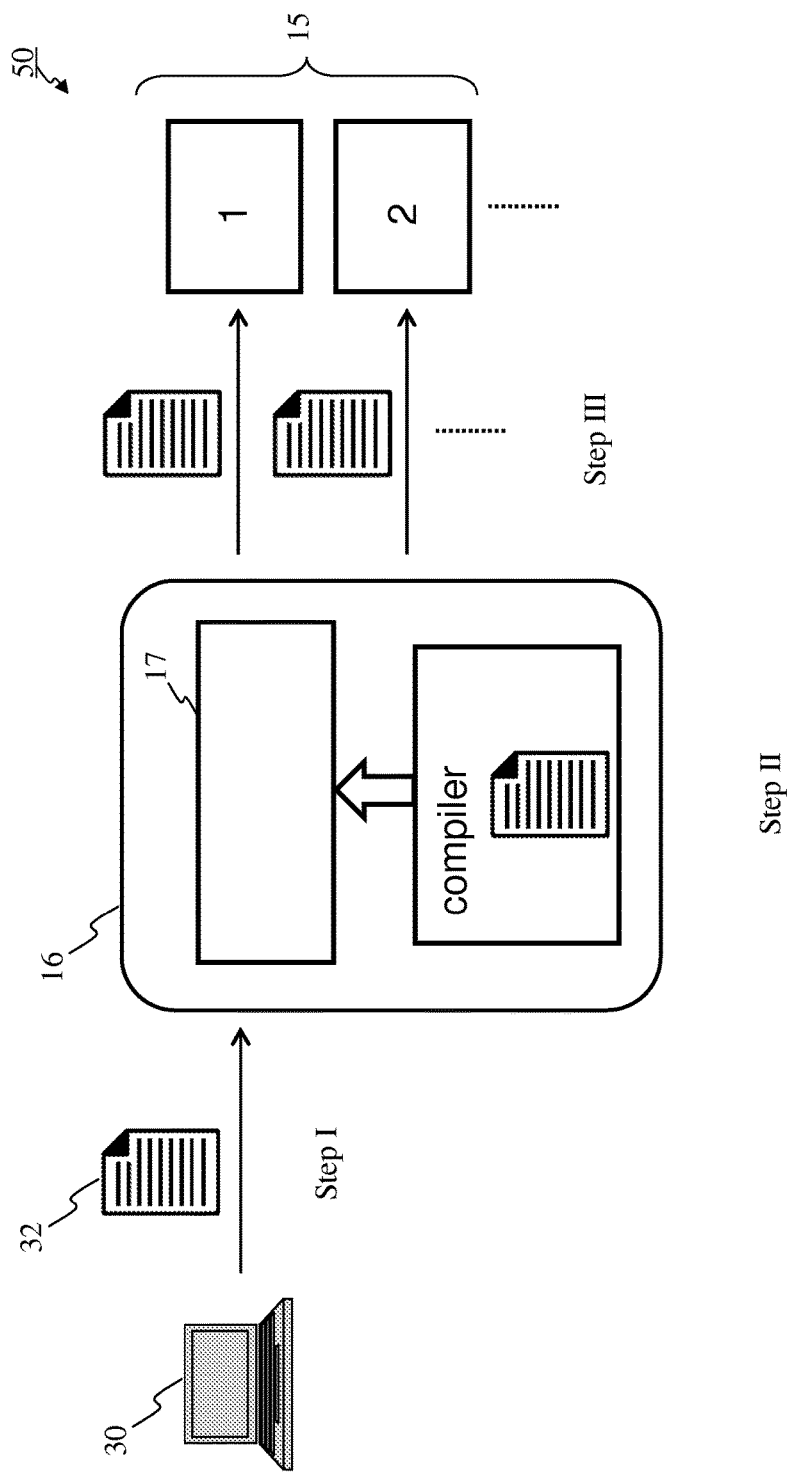

FIG. 10 schematically illustrates a system and method according to one embodiment of the invention, wherein said control unit 16 further includes a compiler and said reconfiguration instruction 32 comprises a non-binary file corresponding to said second configuration file ("Step I"), the control unit 16 being operable to compile the non-binary file with the compiler ("Step II") and to execute the compiled non-binary file on processor 17 of control unit 16, so as to configure peripheral device(s) 15 for the second scenario ("Step III").

A reconfiguration instruction 32 may also, in one embodiment, comprise any combination of one or more compiled binary files to be executed, one or more non-binary files to be interpreted by control unit 16, and one or more non-binary files to be compiled by control unit 16.

Figure 11:
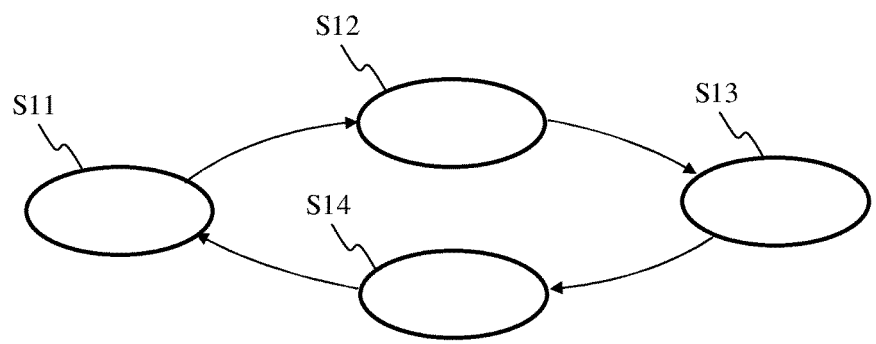
FIG. 11 is a diagram of a state machine of a control unit used in a system and method in one embodiment of the invention.

FIG. 11 is a diagram of a state machine of a control unit 16 used in a system and method in one embodiment of the invention. The state machine involves four states, denoted S11 to S14, and may be maintained by a computer program executed in processor 17 of control unit 16.

In state S11 ("Unloading"), the peripheral device(s) 15 involved in a first scenario (in accordance with a first configuration file) are being unloaded (i.e., set inactive). The transition from state S14 to state S11 may for example occur when the production or distribution according to the first scenario is terminated.

In state S12 ("Idle"), the peripheral device(s) 15 are all put in an inactive state, and control unit 16 can detect that each peripheral device 15 is in an inactive state. In other words, all used peripheral device(s) 15 are set inactive. States S11 and S12 constitute an exemplary implementation of step S2 as described earlier with reference to FIG. 2.

When control unit 16 receives a reconfiguration instruction 32 from an external source 30, the state machine is then transitioned to state S13 ("Loading"). This state transition corresponds to step S3 described earlier with reference to FIG. 2, and state S13 corresponds to step S4 described earlier with reference to FIG. 2. In state S13, the peripheral device(s) 15 involved in a second scenario (in accordance with a second configuration file) are configured, i.e. prepared for operating in said second scenario.

When control unit 16 detects that the peripheral device(s) 15 being necessary for the second scenario have been successfully configured and are ready for carrying their respective operation according to the second configuration file, the state machine transitions from state S13 to state S14 ("Running"). This state transition corresponds to step S5 described earlier with reference to FIG. 2, and state S14 corresponds to step S6 described earlier with reference to FIG. 2. In state S14, the peripheral device(s) 15 are then controlled and operate according to the scenario for which they have been configured in state S13.

In an exemplary embodiment, a method and system may be as follows. Four peripheral devices 15 are provided: two cameras, i.e. "camera 1" and "camera 2", and two printers, i.e. "printer 1" and "printer 2". This corresponds to the physical configuration of the system. The drivers corresponding to each of the four peripheral devices 15 are loaded on control unit 16 on startup, but are initially in an inactive state. The control unit 16 is in "idle" state (state S12 according to the state machine of FIG. 11).

Control unit 16 then receives, from an external source 30, a reconfiguration instruction 32 for configuring the system 50 according to a scenario involving "camera 1" and "printer 1". Control unit 16 changes its state into "loading" (state S13 according to the state machine of FIG. 11) and each peripheral 15 receives its new configuration; the logic of control unit 16 and the I/O controller are configured as well. When all peripheral devices 15 are successfully configured, control unit 16 changes its state to "run" and production can start (state S14 according to the state machine of FIG. 11).

When control unit 16 receives a "complete" command from an external source 30, control unit 16 switches its state to the "unloading" state (state S11 according to the state machine of FIG. 11) and stops all peripheral devices 15. Once all peripheral devices 15 are stopped, control unit 16 switches back to the idle state (state S12) and control unit 16 is ready to receive a new reconfiguration instruction 32.

If control unit 16 then receives, from an external source 30, a new configuration instruction 32 for configuring system 50 according to a new scenario involving "camera 1", "camera 2" and "printer 1", control unit 16 changes its state from "idle" (state S12) into "loading" (state S13), and each peripheral device 15 receives its new configuration; the logic of control unit 16 and the I/O controller may be configured as well. When all peripheral devices 15 are successfully configured, control unit 16 changes its state from "loading" (state S13) to "run" (state S14) and a new production can start.

If during that production, "printer 2" ceases to function, control unit 16 detects this condition and reports it to the operator, but control unit 16 will not change its state because "printer 2" is not used in the current configuration, i.e. in the current scenario. In contrast, if a problem is detected with "printer 1" which is currently being used, control unit 16 first reports the error and then switches to idle mode (state S12) because the production cannot continue. The transition to idle mode (state S12) in this error situation may for example be carried out via the unloading state or via other states, which are not illustrated in FIG. 11.

Figure 12:
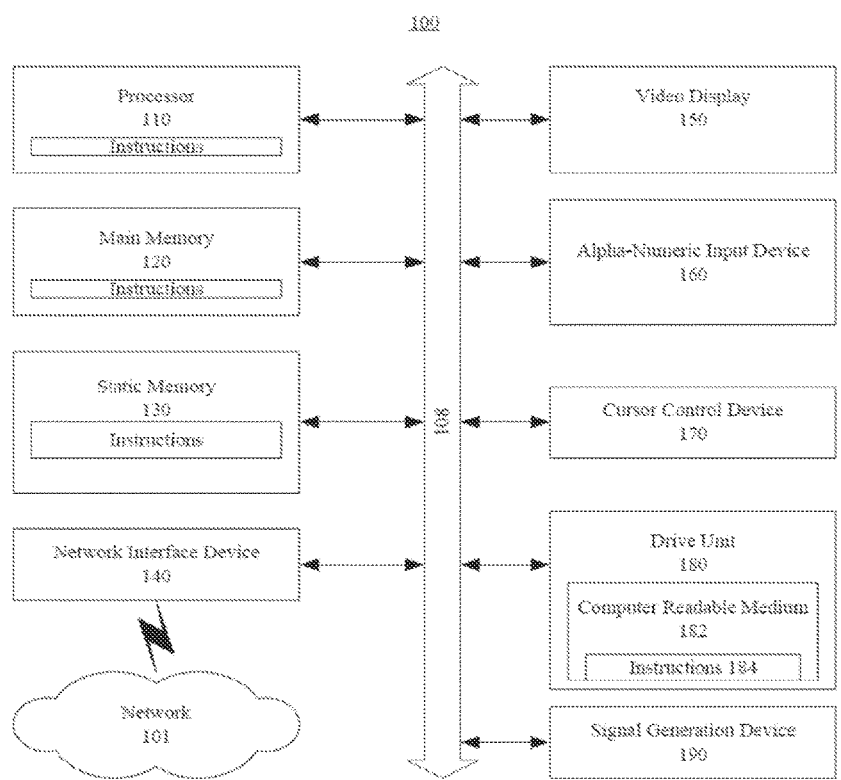
FIG. 12 schematically illustrates an exemplary general computer system that includes a set of instructions for networked device access control, according to an aspect of the present disclosure.

FIG. 12 is an illustrative embodiment of a general computer system, on which a method of networked device access control can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices. For example, computer system 100 may operate as a control unit 16 and may be connected or connectable to external source(s) 30 and peripheral device(s) 15. As another example, computer system 100 may operate as an external source 30 and may be connected or connectable to control unit 16. As yet another example, computer system 100 may operate as a peripheral device 15 and may be connected or connectable to control unit 16.

In a networked deployment, computer system 100 may operate in the capacity of a server or as a client user computer in a server-client user network environment, or as a peer computer system in a peer-to-peer (or distributed) network environment. Computer system 100 can also be implemented as or incorporated into various devices, such as a stationary computer, a mobile computer, a personal computer (PC), a laptop computer, a tablet computer, a wireless smart phone, a personal digital assistant (PDA), a communications device, a control system, a web appliance, a workstation computer, a checkpoint control system, a server, an access controller, an authentication system controller, a control computer, a biometric input device, an electronic card reader, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 12, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 12, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 124 may reside completely, or at least partially, within the main memory 120, the static memory 130, and/or within the processor 110 during execution by the computer system 100. The main memory 120, the static memory 130, and the processor 110 also may be or may include computer-readable media that are tangible and non-transitory during the time instructions 184 are stored therein. As used herein, the term "non-transitory" is meant only to be interpreted by one of ordinary skill in the art, and not as an eternal characteristic of something that would last forever. The term "non-transitory" specifically disavows fleeting characteristics such as transitory characteristics of a particular carrier wave or signal or other forms that exist only briefly in any place or time.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. Nothing in the present application should be interpreted as being implemented or implementable solely with software and not hardware such as a tangible processor and tangible memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140. The computer-readable medium 182 or any other computer-readable medium contemplated herein may be a tangible machine or article of manufacture that is tangible and non-transitory for a period of time during which instructions and/or data are stored therein or thereon.

Figure 13:
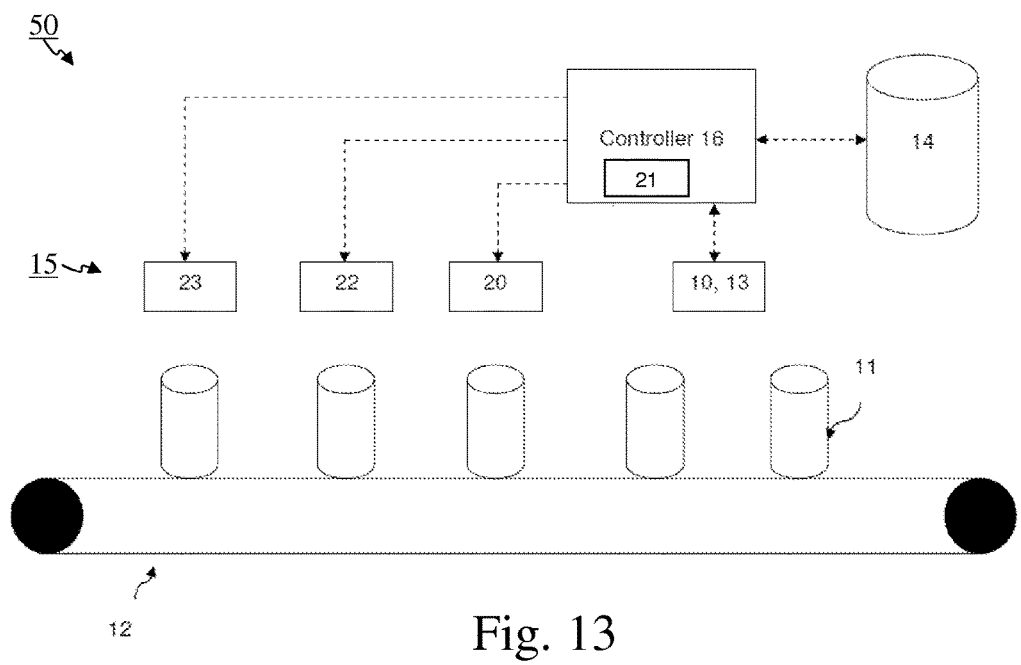
FIG. 13 schematically illustrates an exemplary production and/or distribution line control system in accordance with one embodiment of the invention.

FIG. 13 shows an exemplary production and/or distribution line control system in accordance with one embodiment. FIG. 13 may illustrate either the same system 50 as depicted on FIG. 4 or another system 50. In the example illustrated in FIG. 13, the control system 50 includes, but is not limited to, a conveyor 12, a database 14, a control unit 16 (also called "controller" throughout the present application), an imaging and image processing device 10, 13, an ejector 20, an input/output (I/O) device 21, a printer 22 and an authenticator 23. Imaging and image processing device 10, 13, ejector 20, I/O device 21, printer 22 and authenticator 23 act as, and are, peripheral devices 15. The controller 16, which can be any known processor or controller device, is operable to receive data from each of the database 14, the controller 16, the imaging and image processing device 10, 13, the ejector 20, the I/O device 21, the printer 22 and the authenticator 23. The controller 16, as explained further below, is also operable to control each of the components (i.e., each of peripheral devices 15) based on a set of instructions in the controller 16 or provided to the controller 16. It is appreciated that any number of components (i.e., peripheral devices 15) may be used on the production and/or distribution line, and the components (i.e., peripheral devices 15) listed herein are for exemplary purposes and non-limiting.

The imaging device 10, such as a camera or any known device capable of taking an image, is operable to take an image of an item 11 on the production and/or distribution line (conveyor 12) and transmits the image to the image processor 13. (In the example of FIG. 13, the imaging device 10 and the image processor 13 are represented as included in a same imaging device. However, it is appreciated that they may be separate devices.). The camera may operate, given a trigger from the I/O device 21, to capture a printed code (which could be in any format, including but not limited to, human readable, 1D, 2D, QR, etc.) on an item 11 traversing the line conveyor 12. The camera may also operate to capture an image with marking information that is configured to be printed or stored in a database, and when a comparison value is less than a predetermined threshold value defined in the database 14, instructing an ejector 20 (described below) to eject, from the line, the product item 11 associated with the marking information.

The image processor 13 is operable to receive the image from the imaging device 10, detect a pattern in the received image, identify a product type corresponding to the detected pattern, and obtain identified product type data. The image processor 13 is further operable to identify the item 11 in the received image and obtain identified item data. The identification of the product type may be carried out by conventional techniques of digital data processing (relating to image retrieval, feature detection etc.). The image processor 13 is operable to transmit the obtained identified product type data and identified item data to the controller 16. The controller 16 is operable to receive from the image processor 13 the identified product type data and the identified item data, check if the received identified product type data and identified item data match the corresponding received associated product type identification information and item identification information, and, in case of matching and store the production data in the database 14.

An I/O device 21 is configured to control triggering of each of the other components on the production line. Specifically, given the specific configuration for the current production run (i.e., the current scenario), the I/O device 21 will receive a signal from an input port triggered by a sensor (e.g. laser), pass this signal to the controller 16, which in turn will process the input signal according to the production run configuration (e.g. wait a given time or distance delay), i.e. according to the current scenario and its corresponding configuration file, before requesting again the I/O device 21 to send a signal to an output port that will cause for a given device on that output port to be triggered.

The controller 16, in case any of the identified product type data and identified item data do not match the corresponding associated product type identification information and item identification information, is operable to issue a corresponding identification error information and stores the issued identification error information in the database 14. Additionally or alternatively, the controller 16 can instruct the ejector 20 to eject the item, as described below.

The control system 50 also includes, for example, a printer 22 for printing product information, authentication data, or any other type of information on the product line item(s) 11. The printer 22 can be, for example an electrophotographic printer, e.g. a laser printer, an LED printer, an inkjet printer, or any other type of printing system.

The control system 50 also includes, for example, an authenticating device 23 for detecting and authenticating marking information (authentication identification) which is included on the item 11. The authentication may for example be based on detecting a genuine security feature on the item 11, as known in the art. The authentication device 23 transmits the result of authentication to the controller 16, which, if the item is not authenticated, issues a corresponding authentication error message and stores this message in the database 14. Moreover, the controller 16 may issue a command to the ejector 20 to eject the item 11.

An ejector 20 is for ejecting the items 11 on the production line when instructed by the controller 16. The ejector 20, as described above, may be triggered by controller 16 through the I/O device 21, and is responsive to a set of instructions indicating the rules for ejecting an item 11 from the production line. These rules may depend on the current scenario, and these rules may be configured on the I/O device 21 of the ejector 20 during step S4 described above with reference to FIG. 2. Rules may also be configured on any other component (i.e., peripheral device 15) during step S4, as discussed above.

In an exemplary use of the production and/or distribution line system, a production line has a hardware configuration consisting of a conveyor (or carrier) 12, printer 22, a camera 10, 13 and an ejector 20. The conveyor 12 moves product items 11 along the production line. The I/O device 21 is responsible for causing the various components to trigger at appropriate times. The printer 22 is capable of, given a trigger, printing a multitude of code formats on a product item moved along the conveyor 12. The camera capable of, given a trigger, capturing the printed code of a multitude of code formats (human readable, 1D, 2D, QR) on a product item moved forward by the conveyor 12. An ejector 20 capable of, given a trigger, ejecting a product item from the conveyor 12. In order for the production line to operation, it requires software to configure the system. Conventional approaches are centred around accommodating a system supporting a single use-case only. With these approaches, the systems are provided with, typically pre-loaded, device configuration files that specify how the individual devices should work (e.g., the format of the code a given printer should print, or in which area of an image a camera should search for and extract a given code of a given format), as well as a fixed orchestration that is hard coded in the binary, which defines the overall static behaviour of the production line. As the production line software loads, it reads the hardware configuration, stored locally, loads the appropriate drivers for the components/devices (e.g. printer, camera, I/O), initializes and starts the I/O device, and initializes communication with the devices. Hereafter, the production line software remains idle. In this state, the production line software has no specification/knowledge/instruction regarding management of the devices.

In contrast, in some embodiments of the invention, when the control unit 16 receives a reconfiguration instructions, comprising or indicating a configuration file (corresponding to a production or distribution scenario, i.e. to a production or distribution run), the production line software will receive a specification (instruction) defining, for example, (1) which peripheral devices 15 should be configured for use in any particular scenario or production run, (2) the configuration for each peripheral device 15 required for the scenario or production run, and (3) how to manage the peripheral devices 15, both individually and to communicate with one another. The scenario or production run may be provided locally or from a remote system, and can be provided from a computer, mobile device, tablet or any other device, i.e. external source 30, capable of performing such an action. A further description of the providing instructions to the software will be explained below. When configuring each of the peripheral devices 15, the instructions for each peripheral device 15 specify, for example, how each peripheral device 15 will operate. For example, the instruction may specify which code format to use when printing, or what the camera should capture and extract from the images it takes. In particular, the management of peripheral devices 15 describes the logic (instructions) applied during the scenario or production run. For example, in one scenario or production run involving the printer 22, the camera 10, 13 and ejector 20, the printer 22 might print a code on a product item that the camera 10, 13 will thereafter read. Using a comparison algorithm (defined in the logic) to determine whether the printed code and the code on the product image match, the ejector 20 might be trigged to eject the product item 11 if the comparison fails. In another scenario or production run, for example, the instructions may define that ejection should only occur following a predetermined threshold of consecutive comparison failures. In yet another exemplary scenario or production run, a failed comparison may result in the production line conveyor 12 to stop without ejecting the product item 11. It is appreciated that the examples are non-limiting and that the instructions may be created and modified to create any number of production line requests or orders.

Figure 14:
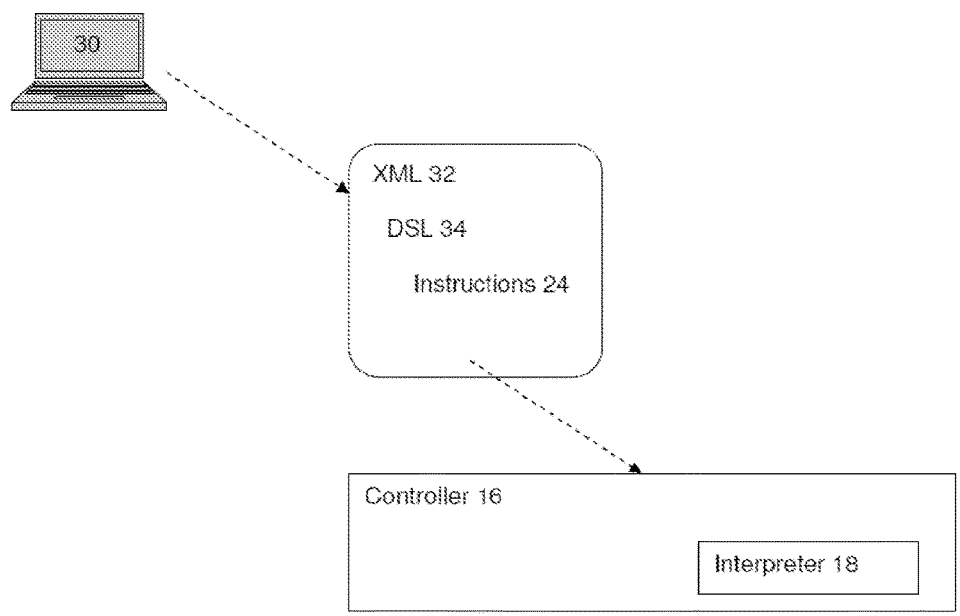
FIG. 14 schematically illustrates an exemplary diagram of configuring a controller (or control unit) to control a production and/or distribution line in accordance with an embodiment of the invention.

FIG. 14 shows an exemplary diagram of configuring a controller 16 to control a production and/or distribution line in accordance with an embodiment, which may or may not be the same as the embodiment described with reference to FIG. 9. In the exemplary embodiment, there is a processing device acting as external source 30, such as a computer, mobile device, tablet, etc., that includes an XML 32 file that includes a domain specific language (DSL) 34 embedded inside the XML file. The DSL is provided as an instruction or instruction set 24 that is sent with the XML file to the controller 16 in the production and/or distribution line. For example, the instruction set would include:

(1) an instruction to retrieve the next set of information to be printed on a product item,
(2) an instruction requesting a printer to print some information on the passing product item,
(3) an instruction requesting a camera to acquire an image of the passing product item, and extract information,
(4) an instruction to compare what was printed to what was extracted from the camera, and
(5) an instruction informing an ejector to eject the passing product item.

It is appreciated that the above example is non-limiting and that any number of instructions may be applied in the set.

The DSL will be extracted from the XML file and interpreted by an interpreter 18 of the production line software during runtime. The DSL is based on the stack machine paradigm where filters represent device-specific or computational activities that take place when the product item 11 moves on the line. The DSL allows also for splitting and joining with round-robin strategy. Other approaches known by the skilled in the art can also be considered, e.g., a stream processing approach. Accordingly to this embodiment, a single physical production line may be used for different operations, as well as be accomplished on a production run basis by being able to dynamically configure the production line software to accommodate the devices and operational logic accordingly.

Figure 15:
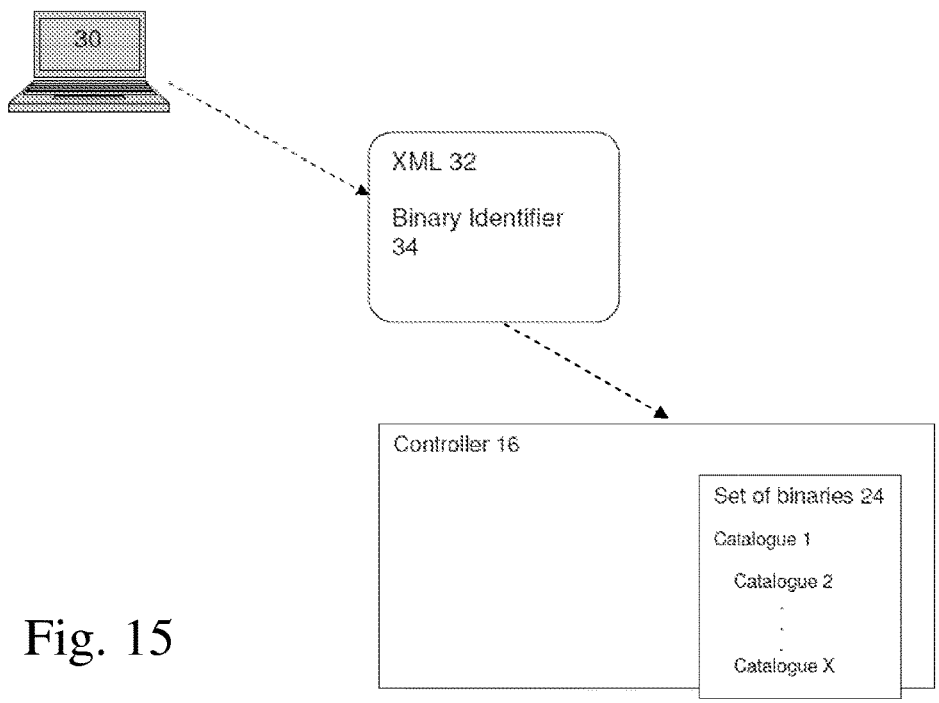
FIG. 15 shows an exemplary diagram of configuring a controller (or control unit) to control a production and/or distribution line in accordance with another embodiment of the invention.

FIG. 15 shows an exemplary diagram of configuring a controller 16 to control a production and/or distribution line in accordance with another embodiment, which may or may not be the same as the embodiment described with reference to FIG. 7. In the exemplary embodiment, there is a processing device 30 acting as external source 30, such as a computer, mobile device, tablet, etc., that includes an XML 32 file that includes a Binary Identifier 34 embedded inside the XML file. The identifier identifies one binary, i.e. one configuration file, from a catalogue of binaries 24 (catalogue 1—X or configuration files 1—X) that have been bundled as part of the controller binary 16. For example, each catalogue/configuration file 1—X is representative of a production and/or distribution line order that a client (external source 30) may select for programming the production/distribution line software during runtime. When the XML file 32 is sent from the processing device 30 (external source) to the controller 16, the identifier is extracted and embedded into the XML to identify the selected binary from the catalogue of bundled binaries/configuration files 24.

Figure 16:
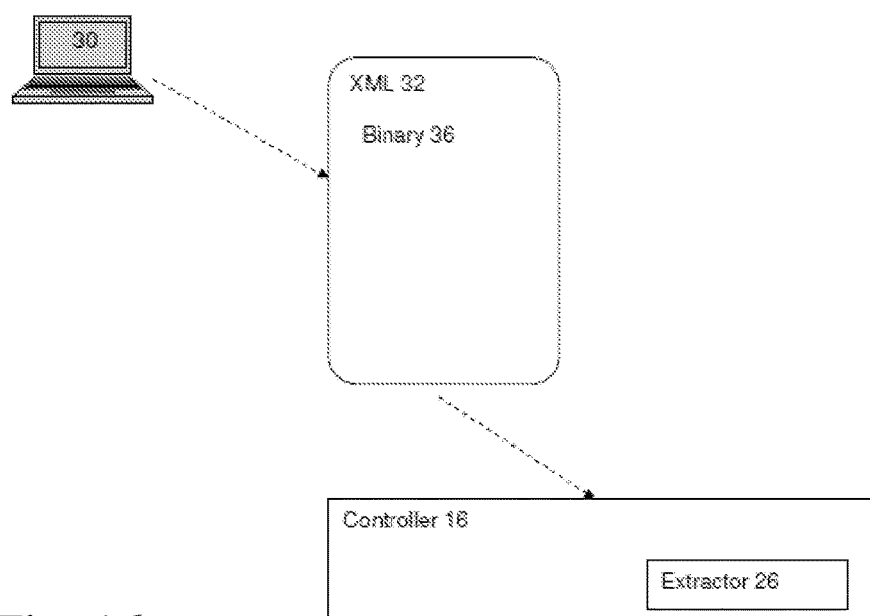
FIG. 16 shows an exemplary diagram of configuring a controller (or control unit) to control a production and/or distribution line in accordance with yet another embodiment of the invention.

FIG. 16 shows an exemplary diagram of configuring a controller to control a production and/or distribution line in accordance with another embodiment, which may or may not be the same as the embodiment described with reference to FIG. 10. In the exemplary embodiment, there is a processing device 30 acting as external source 30, such as a computer, mobile device, tablet, etc., that includes an XML 32 file that includes the specific binary instructions 36 embedded inside the XML file. The binary instructions are similar to those stored in the example provided with respect to FIG. 15. However, rather than bundling the catalogue of binaries with the controller 16, the catalogue of binaries in this case are bundled with the processing device 30 (external source 30). Once the binary from the catalogue is selected, the binary associated with the catalogue is embedded into the XML file 32. When the XML file is sent from the processing device 30 (external source 30) to the controller 16, the binary is extracted and processed by the controller 16 to program the software in the production and/or distribution line.

FIG. 17 is an example of segment 33 of a configuration file, which may be used in some embodiments of the invention. The configuration file contains a static configuration defining the physical setup of the line. This configuration does not change from one scenario to the other. For example, the static configuration lists all the peripheral devices 15 physically present on the line. In the example illustrated by FIG. 17, three peripheral devices 15 are physically present: a printer referred to as "printer 1", a camera referred to as "cam 1", and an ejector referred to as "ejector". The exemplary configuration file provides, among other things, the following pieces of information: (a) information about a driver library ("libprinter-driver-x.so") for "printer 1", allowing control unit 16 to communicate with "printer 1" for example using the Universal Serial Bus (USB) serial bus standard; (b) information about an IP address ("192.168.1.30") and port ("1024") of "cam 1", allowing control unit 16 to communicate with "cam 1" via the IP communications protocol; and (c) an I/O name ("OUTPUT_EJECTOR") of "ejector" allowing control unit 16 to communicate with "ejector" through an I/O card.

FIG. 18 is an example of segment 34 of a configuration file, which may be used in some embodiments of the invention. The configuration file contains a dynamic configuration in a case where the operational logic is already stored in the control unit 16 and merely needs to be selected and loaded. The operational logic is called "liboperational-logic-iss.so" in this example. In other words, the operational logic is specified in the library "liboperation-logic-iss.so". The configuration file lists the peripheral devices 15 used for this production run, i.e. this scenario, namely a camera referred to as "cam 1", a printer referred to as "printer 1", and an ejector referred to as "ejector", and configuration parameters specific to each of these peripheral devices 15, such as for example the configuration parameter "64CD6A9F" referring to a particular driver for the camera.

FIG. 19 is an example of segment 34 of a configuration file, which may be used in some embodiments of the invention. The configuration file contains a dynamic configuration in a case where the operational logic is interpreted (using JavaScript in this example), in a similar manner as described with reference to FIGS. 9 and 14, i.e. the operational logic is provided as a non-binary file in the reconfiguration instruction 32 (in contrast to FIG. 18 illustrating a case wherein the operational logic is already stored in the control unit 16). In the code, two methods are declared and specified. A first method called "getItemCode( . . . )" is invoked when the printer needs a code to be printed on an item, and the invoked method causes the code to be stored in a list in association with the index of an item on the line. A second method called "onItemCode( . . . )" is invoked when the camera has decoded an image, and the invoked method causes a determination as to whether, for a given index, the code obtained by the camera corresponds to the code stored as described above. If there is no correspondence, the ejector status is set so that the ejector will eject the item from the line. If there is a correspondence, then the ejector status is set so that the ejector will not eject the item from the line.

Although the line control system and method have been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet switched network transmission represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. System for controlling a production or distribution line, the system comprising:
   at least one peripheral device operable to perform at least one peripheral device operation on the line, and
   a control unit comprising a processor and a memory storing a control program,
   wherein the control unit is operable to control the at least one peripheral device by executing on the processor the control program to drive each of the at least one peripheral device being necessary according to a first configuration file of the control program, to carry out its respective peripheral device operation(s) according to the first configuration file, wherein the first configuration file corresponds to a first scenario of production or distribution;
   the system being characterized in that said control unit is further operable
      to stop the operations of the at least one peripheral device involved in the first scenario, to put each peripheral device in an inactive state, and then to detect that each peripheral device is in an inactive state;
      to receive a reconfiguration instruction from an external source;
      upon detecting that each peripheral device is in an inactive state and receiving the reconfiguration instruction, to configure each of the at least one peripheral device being necessary according to a second configuration file of said control program, wherein the second configuration file corresponds to a second scenario of production or distribution, and the second scenario differs from the first scenario;
      to detect a state, hereinafter referred to as "ready state", according to which each of the at least one peripheral device being necessary for the second scenario is ready to carry out its respective peripheral device operation(s) according to the second configuration file; and
      upon detecting said ready state, to control the at least one peripheral device by executing on the processor the control program to drive each of the at least one peripheral device being necessary for the second scenario, to carry out its respective peripheral device operation(s) according to the second configuration file, thereby causing a reconfiguration of the line without restarting said control program,
   wherein said second configuration file is stored in the memory and said reconfiguration instruction comprises a name or an identifier of said second configuration file to be executed by the processor of the control unit, and said external source operable to send a reconfiguration instruction to the control unit comprises at least one of:
- a user terminal operable by a user to input said reconfiguration instruction and to send it to the control unit via a communication link; and
- a remote server operable to send said reconfiguration instruction to the control unit via a communication link.

2. The system according to claim 1, wherein said reconfiguration instruction comprises a compiled binary file corresponding to said second configuration file to be executed by the processor of the control unit.

3. The system according to claim 1, wherein said control unit further includes a compiler and said reconfiguration instruction comprises a non-binary file corresponding to said second configuration file, the control unit being operable to compile the non-binary file with the compiler and to execute the compiled non-binary file on the processor of the control unit.

4. The system according to claim 1, wherein said control unit further includes an interpreter and said reconfiguration instruction comprises a non-binary file corresponding to said second configuration file, the control unit being operable to interpret the non-binary file with the interpreter and to execute the interpreted non-binary file on the processor of the control unit.

5. The system according to claim 1, wherein the at least one peripheral device comprises at least one of:
- a peripheral device operable to perform a peripheral device operation consisting in marking an item transported on a conveyor; and
- a peripheral device operable to perform a peripheral device operation consisting in imaging or reading a marking on an item transported on the conveyor.

6. The system according to claim 1, wherein
the at least one peripheral device comprises a plurality of peripheral devices being all involved in both the first scenario and the second scenario; and
the second scenario differs from the first scenario in that at least one of said plurality of peripheral devices is driven to perform at least one peripheral device operation according to the second scenario differently than when driven according to the first scenario.

7. The system according to claim 6, wherein said plurality of peripheral devices comprises:
- a printer operable to perform a peripheral device operation consisting in printing a marking on an item on the conveyor;
- a camera operable to perform a peripheral device operation consisting in capturing a digital image of a marking on an item on the conveyor; and
- an ejector operable to perform a peripheral device operation consisting in ejecting an item from the conveyor.

8. The system according to claim 7, wherein
the processor is further operable to perform image processing operations on a digital image of a marking on an item received from the camera, associate data resulting from said image processing operations with stored item data, and store the associated data in the memory.

9. The system according to claim 7, wherein
the processor is further operable to perform image processing operations on a digital image of a marking on an item received from the camera, compare data resulting from said image processing operations with stored reference item data, and store a result of said comparison in the memory.

10. The system according to claim 1, wherein
the at least one peripheral device comprises a plurality of peripheral devices; and
the second scenario differs from the first scenario at least in that:
the plurality of peripheral devices comprises a first subset of at least one peripheral device involved in the first scenario and a second subset of at least one peripheral device involved in the second scenario, and
the first subset at least partially differs from the second subset.

11. Method for controlling a production or distribution line, the method involving at least one peripheral device operable to perform at least one peripheral device operation on the line, and a control unit comprising a processor and a memory storing a control program, the method comprising:
the control unit controlling the at least one peripheral device by executing on the processor the control program to drive each of the at least one peripheral device being necessary according to a first configuration file of the control program, to carry out its respective peripheral device operation(s) according to the first configuration file, wherein the first configuration file corresponds to a first scenario of production or distribution;
the method being characterized by further comprising the control unit
stopping the operations of the at least one peripheral device involved in the first scenario, putting each peripheral device in an inactive state, and then detecting that each peripheral device is in an inactive state;
receiving a reconfiguration instruction from an external source;
upon detecting that each peripheral device is in an inactive state and receiving the reconfiguration instruction, configuring each of the at least one peripheral device being necessary according to a second configuration file of said control program, wherein the second configuration file corresponds to a second scenario of production or distribution, and the second scenario differs from the first scenario;
detecting a state, hereinafter referred to as "ready state", according to which each of the at least one peripheral device being necessary for the second scenario is ready to carry out its respective peripheral device operation(s) according to the second configuration file; and,
upon detecting said ready state, controlling the at least one peripheral device by executing on the processor the control program to drive each of the at least one peripheral device being necessary for the second scenario, to carry out its respective peripheral device operation(s) according to the second configuration file, thereby causing a reconfiguration of the line without restarting said control program,
wherein said second configuration file is stored in the memory and said reconfiguration instruction comprises a name or an identifier of said second configuration file to be executed by the processor of the control unit, and said external source sending a reconfiguration instruction to the control unit comprises at least one of:
a user terminal operable by a user to input said reconfiguration instruction and to send it to the control unit via a communication link; and a remote server operable to send said reconfiguration instruction to the control unit via a communication link.

12. The method according to claim 11, wherein said reconfiguration instruction comprises a compiled binary file corresponding to said second configuration file to be executed by the processor of the control unit.

13. The method according to claim 11, wherein said control unit further includes a compiler and said reconfiguration instruction comprises a non-binary file corresponding to said second configuration file, the control unit compiling the non-binary file with the compiler and executing the compiled non-binary file on the processor of the control unit.

14. The method according to claim 11, wherein said control unit further includes an interpreter and said reconfiguration instruction comprises a non-binary file corresponding to said second configuration file, the control unit interpreting the non-binary file with the interpreter and executing the interpreted non-binary file on the processor of the control unit.

15. The method according to claim 11, wherein the at least one peripheral device comprises at least one of:
 a peripheral device operable to perform a peripheral device operation consisting in marking an item transported on a conveyor; and
 a peripheral device operable to perform a peripheral device operation consisting in imaging or reading a marking on an item transported on the conveyor.

16. The method according to claim 11, wherein
the at least one peripheral device comprises a plurality of peripheral devices being all involved in both the first scenario and the second scenario; and
the second scenario differs from the first scenario in that at least one of said plurality of peripheral devices is driven to perform at least one peripheral device operation according to the second scenario differently than when driven according to the first scenario.

17. The method according to claim 16, wherein said plurality of peripheral devices comprises:
 a printer operable to perform a peripheral device operation consisting in printing a marking on an item on the conveyor;
 a camera operable to perform a peripheral device operation consisting in capturing a digital image of a marking on an item on the conveyor; and
 an ejector operable to perform a peripheral device operation consisting in ejecting an item from the conveyor.

18. The method according to claim 17, wherein
the processor is further operable to perform image processing operations on a digital image of a marking on an item received from the camera, associate data resulting from said image processing operations with stored item data, and store the associated data in the memory.

19. The method according to claim 17, wherein
the processor is further operable to perform image processing operations on a digital image of a marking on an item received from the camera, compare data resulting from said image processing operations with stored reference item data, and store a result of said comparison in the memory.

20. The method according to claim 11, wherein
the at least one peripheral device comprises a plurality of peripheral devices; and
the second scenario differs from the first scenario at least in that:
 the plurality of peripheral devices comprises a first subset of at least one peripheral device involved in the first scenario and a second subset of at least one peripheral device involved in the second scenario, and
 the first subset at least partially differs from the second subset.

* * * * *